United States Patent [19]

Veldhuis

[11] Patent Number: 4,897,724
[45] Date of Patent: Jan. 30, 1990

[54] APPARATUS AND METHOD FOR REPRODUCING DIGITIZED VIDEO PICTURES, WITH INCLINED PLANE ERROR RESTORATION

[75] Inventor: Raymond N. J. Veldhuis, Eindhoven, Netherlands

[73] Assignee: U.S. Philips Corporation, New York, N.Y.

[21] Appl. No.: 221,692

[22] Filed: Jul. 20, 1988

[30] Foreign Application Priority Data

Jun. 6, 1988 [NL] Netherlands ............... 8801440

[51] Int. Cl.[4] .................... H04N 5/94; H04N 7/13
[52] U.S. Cl. .................... 358/166; 358/106; 358/336
[58] Field of Search ........... 358/166, 167, 336, 339, 358/133, 135, 136, 141, 106

[56] References Cited

U.S. PATENT DOCUMENTS

| 4,785,349 | 11/1988 | Keith | 358/136 |
| 4,792,851 | 12/1988 | Mochizuki | 358/133 |

FOREIGN PATENT DOCUMENTS

| 44963 | 2/1982 | European Pat. Off. |
| 146988 | 7/1985 | European Pat. Off. |

OTHER PUBLICATIONS

Scene Adaptive Coder, Wen-Hsiung Chen et al., IEEE Transaction on Communications, vol. Com-32, No. 3, Mar. 1984, pp. 225-232.

*Primary Examiner*—Tommy P. Chin
*Attorney, Agent, or Firm*—Michael E. Marion

[57] ABSTRACT

A device for reproducing digitally presented video pictures includes a restoration circuit for restoring erroneous picture elements. To this end a reference sub-picture is composed of erroneous and correct picture elements, the erroneous picture elements being entirely enclosed by the correct picture elements. Before restoring the erroneous picture elements, a correction function is determined, starting from the correct picture elements of the reference sub-picture, and by means of this correction function a correction value can be determined for each correct picture element in the reference sub-picture such that the difference picture elements obtained by subtracting the associated correction value from each correct picture element represent a signal whose mean value is zero. A known method of restoring erroneous picture elements can now be used for these difference picture elements.

5 Claims, 5 Drawing Sheets

FIG.2

$$\begin{array}{ccc} 0 & 0 & 0 \\ s(i-2,j-2) & s(i-2,j-1) & s(i-2,j) \\ 0 & 0 & 0 \\ s(i-1,j-2) & s(i-1,j-1) & s(i-1,j) \\ 0 & 0 & \Delta \\ s(i,j-2) & s(i,j-1) & s(i,j) \end{array}$$

$i = 3,4,5, \text{--------}, 10$
$j = 3,4,5, \text{--------}, 10$

APPARATUS AND METHOD FOR REPRODUCING DIGITIZED VIDEO PICTURES, WITH INCLINED PLANE ERROR RESTORATION

A. BACKGROUND OF THE INVENTION

A(1) Field of the invention

The invention generally relates to devices for reproducing digitized video pictures and more particularly to a restoration circuit used in these devices for restoring erroneous picture elements by means of some restoration method.

Such a device may be a television receiver for receiving digital television pictures which are transmitted by a television broadcasting transmitter, but it may also be an apparatus for reproducing digitally stored pictures.

A(2) Description of the prior art

A video picture is generally assumed to be composed of an array of $M_1 \times M_2$ picture elements. For a video picture consisting of 625 lines $M_1 = 625$ and $M_2$ is usually 720. In preparation for transmission such a video picture is subjected to a data reduction process in order to maintain the quantity of bits to be transmitted per second (bit rate) within certain limits. A data reduction method which is very frequently used is transform coding. In this method the video picture is partitioned into sub-pictures of $N \times N$ picture elements each; a typical value of N is four or eight. Each sub-picture is subsequently transformed by means of a two-dimensional transform into a number of so-called coefficients accurately describing this sub-picture. For more information relating to transform coding see, for example, pages 225–232 of Reference 1.

The physical significance of this two-dimensional transform is the following. Each sub-picture is considered to be a sum of a plurality of mutual orthogonal basic pictures each also consisting of $N \times N$ picture elements and each with its own weighting factor. It is these weighting factors, conventionally referred to as coefficients, which are obtained by means of the two-dimensional transform.

If an error occurs in one of the coefficients in the transmission channel, this has consequences for all picture elements of the relevant sub-picture. Literature describes several so-called methods of restoring erroneous signal values in general. These known restoration methods are generally also applicable to video pictures, both in one and in two dimensions. References 2 and 3 describe some of these restoration methods. Notably, the restoration method proposed in Reference 3 may be very promising for video pictures.

The restoration method proposed in Reference 3 is based on the idea that a prediction picture element $\hat{s}(i,j)$ can be determined for each picture element $s(i,j)$ which deviates to a slight extent from the picture element and which can be considered as a linear combination of weighted versions of picture elements located in the vicinity of this picture element. This vicinity will be referred to as prediction field and it is thus understood to mean the collection of those picture elements which are considered for predicting another picture element, hereinafter referred to as reference picture element. Thus, it holds for each prediction picture element that:

$$\hat{s}(i,j) = \sum_k \sum_l a(k,l) s(i-k, j-l) \qquad (1)$$

The weighting factors $a(k,l)$ are conventionally referred to as prediction coefficients and the collection of values $k,l$ considered determines the prediction field.

This known restoration method is also based on the idea that the prediction coefficients should not be considered to be constant throughout the picture, but only within a limited partial region which will be referred to as reference sub-picture and which consists of $P_1 \times P_2$ picture elements. Such a reference sub-picture is chosen to be such that it comprises all erroneous picture elements of an erroneous sub-picture, enclosed by non-erroneous (correct) picture elements. This means that for each reference sub-picture the prediction coefficients should be computed again before the erroneous picture elements can be restored. For computing the prediction coefficients each erroneous picture element within the reference sub-picture is firstly replaced in a preset process by a predetermined auxiliary picture element, for example, by zero, so that an up-dated reference sub-picture is obtained. Subsequently an iteration prediction process is performed. This process comprises a coefficient prediction step in which, as far as is possible, the associated prediction picture element is determined in accordance with expression (1) for each picture element in the up-dated reference sub-picture. Since the prediction coefficients are not known, this means that each picture element is written as a function in $a(k,l)$ of the picture elements of the prediction field chosen. If the difference between a picture element and its prediction picture element is referred to as prediction error and is indicated by $e(i,j)$, it holds that:

$$e(i,j) = s(i,j) - \hat{s}(i,j) \qquad (2)$$

In this expression the prediction error is thus also a function of the prediction coefficients $a(k,l)$. By squaring all prediction errors which can be defined for the reference sub-picture and by adding them, a prediction coefficient function $Q(a)$ is obtained which is thus defined as follows:

$$Q(a) = \sum_i \sum_j e(i,j)^2 \qquad (3)$$

and which is a function of all prediction coefficients. Since the erroneous picture elements were initially set at zero, a first approximation can now be obtained of the set of prediction coefficients applying to the entire reference sub-picture by minimizing the prediction coefficient function $Q(a)$. The minimum value of this prediction coefficient function $Q(a)$ for a given prediction coefficient is obtained by differentiating this function with respect to this prediction coefficient and by setting this derivative to zero. Since this function is quadratic in these prediction coefficients, the first approximation of each prediction coefficient thus follows.

By computing a prediction picture element in accordance with expression (1) by means of these known (first approximation) prediction coefficients in a picture element prediction step, in which the picture elements to be restored are now assumed to be the unknowns, each prediction picture element becomes a function of the unknown picture elements. By determining a prediction error in accordance with expression (2) and by defining, in analogy with expression (3), a picture element function $Q(x)$ in accordance with $$Q(x) = \sum_i \sum_j e(i,j)^2 \qquad (4)$$

a first approximation of the erroneous picture elements follows in a corresponding way as described above. By replacing the original erroneous picture elements in a substitution step by these first approximations, an updated reference sub-picture is again produced and the coefficient prediction step and the picture element prediction step can again be performed, which leads to an even more accurate approximation of the original erroneous picture elements. This can be continued until a sufficiently accurate approximation is obtained.

However, this very promising restoration method unexpectedly appears to yield a disappointing result in practice, when used for video pictures.

B. OBJECT AND SUMMARY OF THE INVENTION

It is an object of the invention to render the above-described restoration method suitable for use with video pictures.

According to the invention the preset process comprises a precorrection step in which each correct picture element of the reference sub-picture is reduced by a correction value dependent on the coordinates of the relevant correct picture element for the purpose of generating difference picture elements, all these correction values being determined by an adaptive correction function determined by a plurality of correction function coefficients, the actual values of the correction function coefficients being obtained by minimizing the sum of the square values of the difference picture elements.

Dependent on whether the reference sub-picture is either one or two-dimensional, a one or two-dimensional correction function will be chosen as a starting point. A straight line determined by two correction function coefficients is preferably chosen as a one-dimensional correction function. A slant plane determined by three correction function coefficients is preferably chosen as a two-dimensional correction function.

The invention is based on the recognition that the restoration method described in Reference 3 can be used successfully for audio signals because such signals have a mean value of zero and do not exhibit any discontinuities. However, a video picture has a completely different character as compared with an audio signal. For example, in a video signal the average brightness is always larger than zero and a brightness gradient can be defined which constantly changes direction. The correction function initially corrects the correct picture elements of the reference sub-picture for the fact that the average brightness of these picture elements is not zero, whilst the slope of the line or the plane is determined in such a way that it is correctly contiguous to the brightness gradient.

C. REFERENCES

1. Scene Adaptive Coder; W. H. Chen, W. K. Pratt; IEEE Transactions on Communications, Vol.. COM-32, No. 3, March 1984.
2. Schaltungsanordnung zur Korrektur gestörter Abtastwerte bei einer PCM Übertragungseinrichtung, insbesondere einer Digital-Tonplatte; W. Scholt; European patent application No. 0 044 963.
3. Method of correcting erroneous values of samples of an equidistantly sampled signal and device for carrying out the method; J. A. Janssen; R. N. J. Veldhuis, H. J. Prins, L. B. Vries; European patent application No. 0 146 988.

D. Explanation of the invention

D(1) BRIEF DESCRIPTION OF THE FIGURES

FIG. 2 shows the reference sub-picture on a larger scale.

D(2) THEORETICAL BACKGROUND

Figure 1:
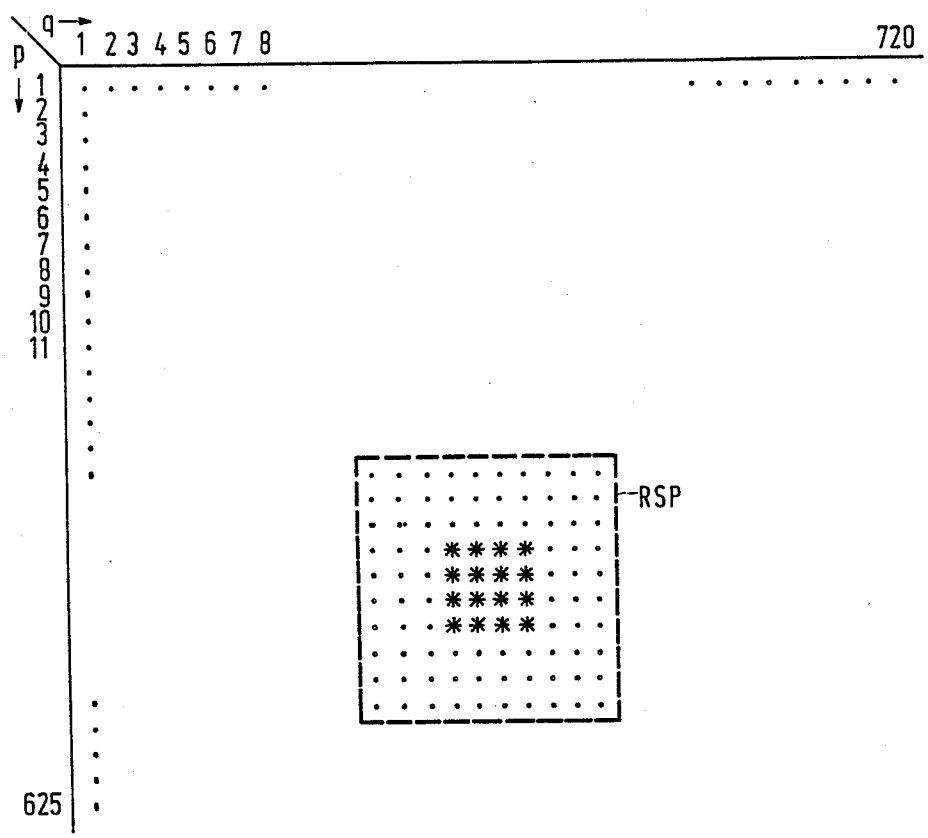
FIG. 1 shows a video picture composed of picture elements with a reference sub-picture comprising picture elements to be restored.
Figure 2:
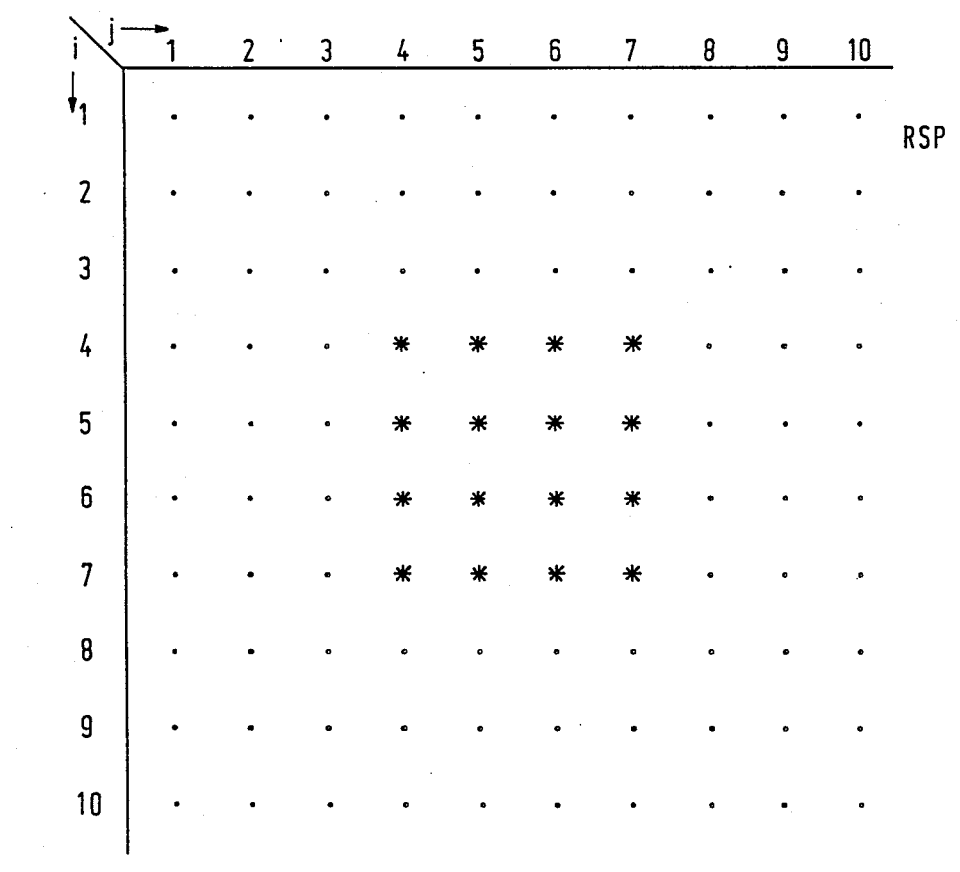

In FIG. 1 dots indicate the picture elements of a video picture composed of 625 lines. Each line comprises 720 picture elements. In this Figure the line numbers p are plotted vertically and the picture element numbers q of the picture elements are plotted horizontally on a line. It will be assumed that for the transmission of such a video picture this picture is subjected to a transform coding in which sub-pictures of $4 \times 4$ picture elements are used. If one of the coefficients of the picture transform cannot be reconstructed, this means that all picture elements of the associated sub-picture are erroneous. In FIG. 1 the erroneous picture elements of such an erroneous sub-picture are denoted by *. For performing the restoration process a reference sub-picture of $P_1 \times P_2$ picture elements is defined first. It comprises the erroneous picture elements of the erroneous sub-picture, as well as non-erroneous (correct) sub-pictures, the erroneous sub-picture being enclosed by the correct sub-pictures. In the video picture shown in FIG. 1 such a reference sub-picture is denoted by RSP. It is to be noted that for the sake of simplicity of the Figure a reference sub-picture of $10 \times 10$ picture elements has been chosen. FIG. 2 again shows this reference sub-picture RSP on a larger scale. Each picture element of this reference sub-picture is identified by its coordinates i and j. A picture element will hereinafter be referred to as $s(i,j)$.

Figures 3, 4:
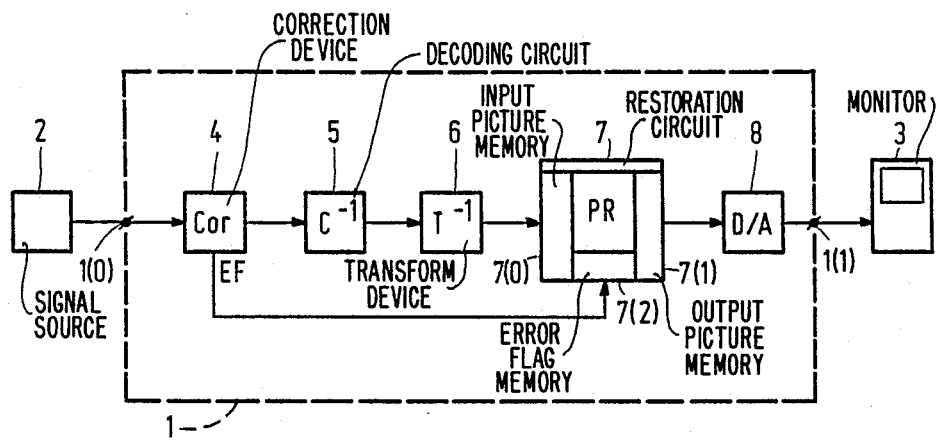
FIG. 3 shows a possible embodiment of a prediction field.
FIG. 4 shows the general structure of the reproduction device according to the invention.

For performing the restoration process a prediction picture element $\hat{s}(i,j)$ is determined, as far as is possible, for each picture element $s(i,j)$ of the reference sub-picture. If the picture element for which a prediction picture element must be determined is referred to as reference picture element, its prediction picture element is equal to the sum of weighted versions of predetermined picture elements located in its vicinity. The latter picture elements constitute the prediction field for the reference picture element. FIG. 3 further illustrates this for the purpose of clarification. In this Figure the symbol $\Delta$ denotes the reference picture element $s(i,j)$ and the symbol o denotes the picture elements of a conventional prediction field. For the prediction picture element it holds in conformity with (1) that $$\tilde{s}(i,j) = \sum_{k=0}^{2} \sum_{l=0}^{2} a(k,l)s(i-k,j-l) \quad (5)$$

with i,j=3, 4, 5, ..., 10. It will now initially be assumed that all picture elements of the reference sub-picture RSP are known. To achieve this, this reference sub-picture is firstly converted by way of a preset process into an up-dated reference sub-picture RSP$_0$ which differs from the original reference sub-picture RSP in that all erroneous picture elements are set to a predetermined value, for example, the value of zero. In order to determine the still unknown prediction coefficients a(k,l) which are different for each reference sub-picture, an iteration prediction process is performed which comprises a plurality of steps. The first step is a coefficient prediction step. In this step the difference between each prediction picture element defined in accordance with (5) and the associated reference picture element in the up-dated reference sub-picture RSP$_0$ is taken. This difference is the prediction error e(i,j) in accordance with expression (2) and is a function of the still unknown prediction coefficients. Those coefficients which yield the smallest quadratic error for the entire reference sub-picture are now chosen as prediction coefficients. To this end the prediction coefficient function Q(a) is defined as follows in accordance with expression (3):

$$Q(a) = \sum_{i=3}^{10} \sum_{j=3}^{10} e(i,j)^2 \quad (6)$$

and this function of the prediction coefficients is minimized so that a set of eight prediction coefficients is obtained in this case.

Since the erroneous picture elements had been given a predetermined initial value which was also erroneous, a second step is performed in this iteration prediction process, the so-called picture element prediction step. In this step a prediction picture element in accordance with expression (5) is determined again for each picture element, using the prediction coefficients a(k,l) computed in the coefficient prediction step and thus being known, on the understanding that the erroneous picture elements now occur as unknowns. Subsequently the prediction errors e(i,j) are again computed and all prediction errors are squared and added together. In accordance with expression (4) this yields the picture element function Q(*) defined by:

$$Q(*) = \sum_{i=3}^{10} \sum_{j=3}^{10} e(i,j)^2 \quad (7)$$

and which is now a function of the unknown (erroneous) picture elements. Minimization of this function yields a set of sixteen picture elements in this case. By replacing the erroneous picture elements in the reference sub-picture RSP by the picture elements thus computed, an up-dated reference sub-picture RSP$_1$ is obtained. The accuracy of the picture elements thus obtained can be increased by performing the coefficient prediction step and the picture element prediction step once again, starting from this up-dated reference sub-picture RSP$_1$. This will lead to an up-dated reference sub-picture RSP$_2$ which in its turn can be subjected successively to a coefficient and picture element prediction step, and so forth. In practice, no visible further restoration of erroneous picture elements is found to be obtained when coefficient and picture element prediction steps have been performed three times. However, very disturbing errors are still found to be present in practice.

As already noted, it has been found in practice that the above-described restoration method only yields good results if the picture elements are zero at an average, which is normally not the case for video pictures. Furthermore the average brightness of a video picture is not constant either, but varies throughout the picture.

To be able to successfully apply the above-described restoration method to video pictures, a correction function U(i,j) is defined which is valid for the entire reference sub-picture RSP. This function establishes a relation determined by correction function coefficients between a correction value for a given picture element and the coordinates i,j of this picture element. For example, this relation represents the previously mentioned straight line of the type $$(8) \ldots U(i,j) = \alpha_0 + \alpha_1 i$$

or a plane of the type $$(9) \ldots U(i,j) = \alpha_0 + \alpha_1 i + \alpha_2 j.$$

In these expressions the quantities $\alpha_0$, $\alpha_1$, $\alpha_2$ represent the said correction function coefficients. Each correct picture element $\tilde{s}(i,j)$ of the reference sub-picture RSP is replaced by a difference picture element s(i,j) which is equal to the difference between the original correct picture element and the correction value assumed by the correction function for the coordinates of this picture element; in other words $$(10) \ldots \tilde{s}(i,j) = s(i,j) - U(i,j).$$

The correction function is now chosen to be such that the difference picture elements have the property that their average value is zero. To achieve this, the correction function coefficients for each reference sub-picture will have to be determined again. To this end the difference picture elements are subjected to mean square error method. In other words, a correction coefficient function Q(u) is determined, which is defined as follows $$Q(u) = \sum_{i=1}^{10} \sum_{j=1}^{10} \{s(i,j) - U(i,j)\}^2 \quad (8)$$

in which s(i,j) is unequal to an erroneous picture element. In other words, the erroneous picture elements (denoted by * in FIG. 2) are not taken into account for determining the correction function. Minimization of the function expressed in (8) yields the wanted correction function coefficients and hence the entire correction function U(i,j) and the difference picture elements $\tilde{s}(i,j)$. By replacing each picture element in the reference sub-picture RSP by its corresponding difference picture element and by subsequently replacing the original erroneous picture elements by zero, an up-dated reference sub-picture RSP'$_0$ is obtained which can be subjected to the previously mentioned iteration prediction process. After performing the latter process, a set of restored difference picture elements is available for the original erroneous picture elements. By adding the associated correction value thereto, the wanted restored picture elements are obtained.

D(3) THE REPRODUCTION DEVICE

FIG. 4 shows diagrammatically the structure of a reproduction device denoted by 1 in this Figure. An input 1(0) of this device receives a digitized video signal from a source 2 (for example, a magnetic tape) and its output 1(1) supplies an analog video signal which is suitable for display on a monitor 3. It will be assumed that the digital signal supplied by the source 2 is obtained by using a transform coding of the original video picture. As already noted, a video picture is split up into sub-pictures of $N \times N$ picture elements in transform coding and each sub-picture is subjected to a two-dimensional transform so that a block of $N \times N$ coefficients is obtained. The value of four is used hereinbefore for N. These coefficients are subsequently recoded. As a result, small coefficients usually become zero. Only the coefficients which are different from zero are further subjected to an error correcting algorithm so that each non-zero coefficient is converted into an error correcting code. It is these error correcting codes of the non-zero coefficients which are supplied by the source 2 together with information indicating which codes are associated with one and the same block and thus jointly define a sub-picture.

In the reproduction device 1 the error correcting codes of a block of coefficients are converted in a correction device 4 into the original non-zero coefficients. These are in their turn decoded in a decoding circuit 5 which thus yields the original block of zero and non-zero coefficients. This block of coefficients is transformed in a two-dimensional inverse transform device 6 to a sub-picture which largely corresponds to the original sub-picture from which the received coefficients have been derived. This sub-picture, together with the other sub-picture constituting the picture, is stored in an input picture memory 7(0) of a restoration circuit 7. This restoration circuit 7 also has an output picture memory 7(1) whose contents are read picture element after picture element and line after line. These picture elements are converted in a digital-to-analog converter 8 into an analog video signal which can be displayed on monitor 3.

In addition to the original non-zero coefficients the correction device 4 supplies an error flag EF. It has the logic value "0" if all error correcting codes of a block can be converted into the original coefficients. If this is not the case for one or more of these error correcting codes of a block, EF will become 1. This means that the relevant error correcting codes comprise more erroneous bits than can be corrected. The error flag EF occurring for each block of coefficients is directly applied to the restoration circuit 7 and stored in a flag memory 7(2) at a memory location which corresponds to the location of the relevant sub-picture in the complete picture.

The restoration circuit 7 not only comprises the input picture memory 7(0), the output picture memory 7(1) and the error flag memory 7(2), but also a processor PR which may have the form of a microcomputer. This processor writes the picture elements of a sub-picture of the input picture memory 7(0) in an unchanged form in adequate memory locations of the output picture memory 7(1) if EF=0 holds for that sub-picture. This method is shown by means of the steps 70 and 71 in the flow chart of FIG. 5. More particularly, it is checked in step 70 whether EF=0 for a sub-picture to be transferred. If this is the case, the picture elements of this sub-picture are stored, in step 71, one by one and unchanged in adequate memory locations of the output picture memory 7(1). However, if it appears that EF32 1, the relevant, sub-picture consists of erroneous picture elements which must be restored. To this end a restoration process 72 is performed. It comprises a reference sub-picture defining step 72.1 in which the erroneous picture elements and the correct picture elements together constituting a reference sub-picture RSP are transferred from the input picture memory 7(0) to a working memory of the processor PR. This working memory then comprises, for example, the reference sub-picture RSP shown in FIG. 2. Subsequently a preset process 72.2 is performed which comprises a plurality of steps. In a correction coefficient step 72.2(1) the correction coefficient function Q(u) indicated in expression (8) is minimized. This yields the desired correction function coefficients and hence the different correction values $U(i, j)$ for the different picture elements of RSP. In a difference producing step 72.2(2) the now known correction value $U(i,j)$ is subtracted from picture element $s(i,j)$ of RSP. This yields a difference sub-picture RSP' of difference picture elements. Before subjecting this difference sub-picture RSP' to the iteration prediction process 72.3, those difference picture elements located at the locations corresponding to the erroneous picture elements are set to zero in a step 72.2(3). This yields a difference sub-picture RSP'$_0$. In an intermediate step 72.4 the value of zero is allocated to a count H and subsequently the difference sub-picture RSP'$_0$ is subjected to the iteration prediction process 72.3. This process comprises a coefficient prediction step 72.3(1) in which the prediction coefficient function Q(a) indicated in expression (6) is minimized, starting from the difference sub-picture RSP'$_0$. This yields a set of prediction coefficients a(k,l). This set is subsequently used in a picture element prediction step 72.3(2) to determine a set of restored difference picture elements s•(k,l) by minimizing the picture element function Q(*) indicated in expression (7). In a substitution step 72.3(3) those difference elements in the difference sub-picture RSP'$_0$ whose locations correspond to the erroneous picture elements in the reference sub-picture RSP are replaced by the restored difference picture elements s•(k,l). This yields a difference sub-picture RSP'$_1$ which can again be subjected to the iteration prediction process. Whether this actually happens will depend on the value of the count H after in a step 72.3(4) it has been augmented by one. If it is found in a comparison step 72.3(5) that the new value of this count H has not yet reached a given value (four in this case), the steps 72.3(1) to 72.3(5) inclusive are performed once again, though starting from the difference sub-picture RSP'$_1$. If the count H has reached the predetermined value, the correction values $U(i,j)$, as they are known after performing correction coefficient step 72.2(1), are added in an adding step 72.4 to the picture elements of the last-obtained difference sub-picture RSP'$_3$. The restored picture elements of the reference sub-picture RSP$_{rest}$ with restored picture elements thus obtained are stored in adequate memory locations of the output picture memory 7(1) of the restoration circuit in a substitution step 72.5. Subsequently it is checked which error flag EF is associated with a subsequent sub-picture in input picture memory 7(0), and so forth.

Since only the correct picture elements of the reference sub-picture RSP are considered for determining the correction function in step 72.2(1), this correction function is only a rough approximation of the correction function which would have been obtained if the erroneous picture elements had been known and taken into consideration.

Figure 5:
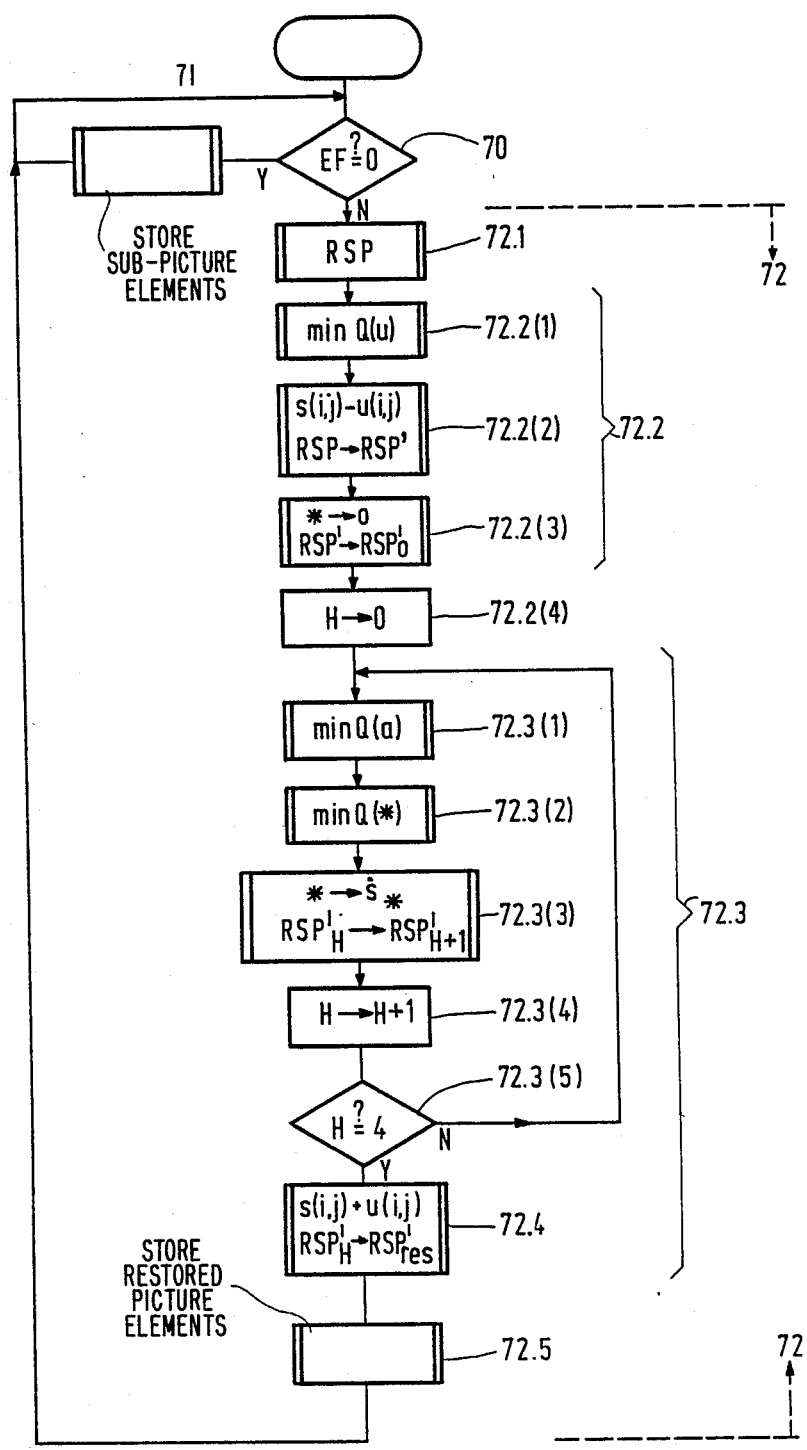
FIG. 5 shows a flow chart describing the operation of the restoration circuit shown in FIG. 4.
Figure 6:
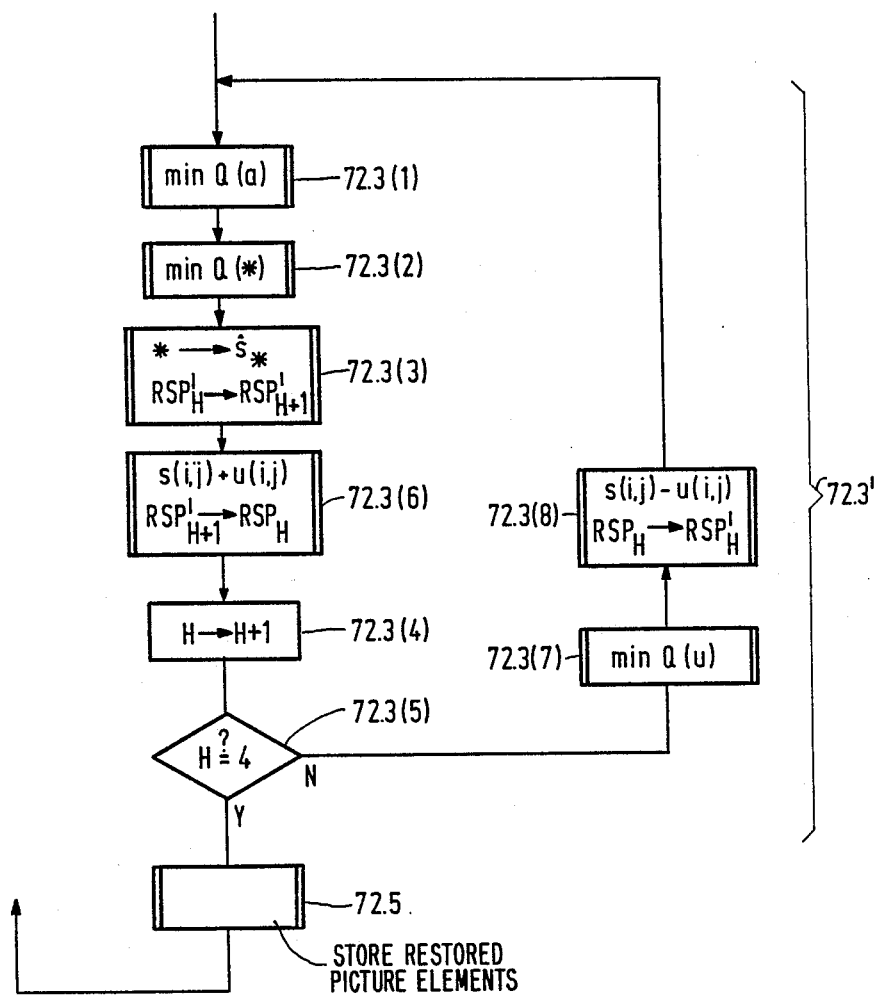
FIG. 6 shows by way of a flow chart a further improvement of the operation of the restoration circuit shown in FIG. 4.

A better approximation of the correction function coefficients and hence of the erroneous picture elements can be obtained by performing the iteration prediction process in the way as is illustrated in FIG. 6. In this FIG. 6 process steps corresponding to those in FIG. 5 have the same reference numerals.

The iteration prediction process illustrated in FIG. 6 differs from that in FIG. 5 in that in an adding step 72.3(6) a correction value $U(i,j)_H$ is added to each of the difference picture elements of the difference sub-picture $RSP'_{H+1}$ obtained after performing substitution step 72.3(3). This yields a restored reference sub-picture $RSP_H$. If the count H is not yet equal to four, this restored reference sub-picture $RSP_H$ is subjected to a correction coefficient step 72.3(7) in which, similarly as in step 72.2(1), the correction coefficient function $Q(u)$ indicated in expression (8) is minimized, taking all picture elements of the restored reference sub-picture into consideration. This yields the desired correction function coefficients and hence the different correction values $U(i,j)_H$ for the different picture elements of $RSP_H$. By subtracting these correction values $U(i,j)_H$ in a subtraction step 72.3(8) from the picture elements of the restored reference sub-picture $RSP_H$, a difference sub-picture $RSP'_H$ is obtained again which is subjected again to the coefficient prediction step 72.3(1), and so forth. The introduction of the adding step 72.3(6) has superseded the initial adding step 72.4.

What is claimed is:

1. A device for reproducing digitally received video pictures composed of an array of picture elements comprising a reference sub-picture, said device including means for restoring erroneous picture elements located within said reference sub-picture within which said erroneous picture elements are enclosed by non-erroneous picture elements, means for performing a preset process and an iteration prediction process, characterized in that in said preset process a correction coefficient step is performed in which each non-erroneous picture element is reduced by a correction value dependent on the coordinates of the relevant non-erroneous picture element of the reference sub-picture thereby generating a first group of difference picture elements, and wherein said correction values are determined by a plurality of correction function coefficients, the actual values of which are obtained by minimizing the sum of the square values of said first group of difference picture elements.

2. A device as claimed in claim 1 in which said iteration prediction process comprises a coefficient prediction step for determining a set of prediction coefficients for a plurality of picture elements of a predetermined prediction field by minimizing a prediction coefficient function; a picture element prediction step for determining, on the basis of said prediction coefficients, a plurality of restored picture elements by minimizing a picture element function; and an adding step whereby said correction value is determined by an adaptive correction function and is added to each picture element of said reference sub-picture in which erroneous picture elements are replaced by said restored picture elements, said reference sub-picture being further subjected to said correction coefficient step for re-generating a further group of difference picture elements to be subjected to said iteration prediction process.

3. A device as claimed in claim 2, characterized in that said adaptive correction function represents a plane which has a constant value determined by a first correction function coefficient for each picture element within said reference sub-picture and which has a slope determined by two further correction function coefficients.

4. A device as claimed in claim 1, in which said iteration prediction process comprises an adding step whereby said correction value is determined by an adaptive correction function.

5. A device as claimed in claim 4, characterized in that said adaptive correction function represents a plane which has a constant value determined by a first correction function coefficient for each picture element within said reference sub-picture and which has a slope determined by two further correction function coefficients.

* * * * *